A. McCLANAHAN.
Improvement in Implements for Opening Fruit-Cans.
No. 133,108. Patented Nov. 19, 1872.
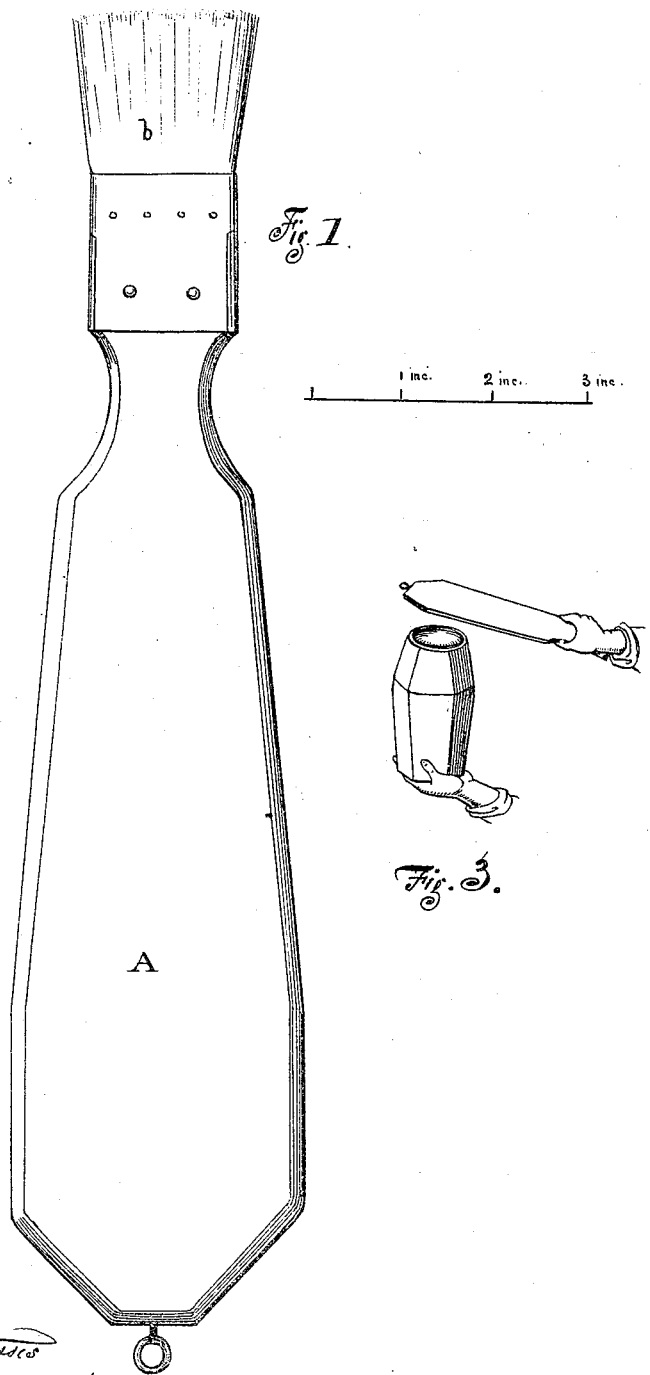
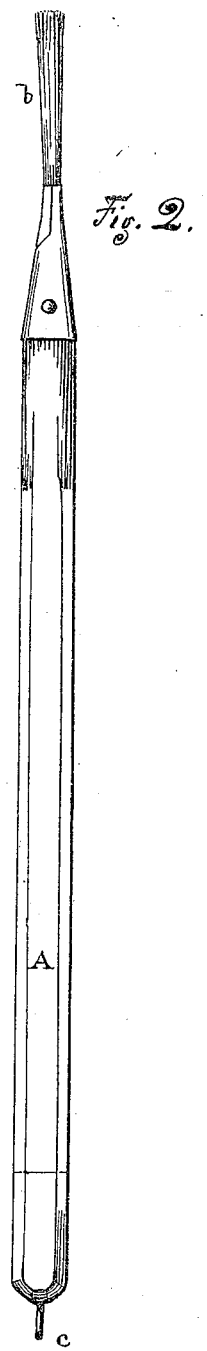

UNITED STATES PATENT OFFICE.

ALEXANDER McCLANAHAN, OF BATH, ILLINOIS.

IMPROVEMENT IN IMPLEMENTS FOR OPENING FRUIT-CANS.

Specification forming part of Letters Patent No. 133,108, dated November 19, 1872.

*To all whom it may concern:*

Be it known that I, ALEXANDER McCLANAHAN, of Bath, in the county of Mason and in the State of Illinois, have invented an Implement for Opening Wax-Sealed Fruit Jars or Cans; and do hereby declare that the following is a full, clear, and exact description thereof, reference being had to the annexed drawing making a part of this specification, in which like letters of reference refer to like parts, and in which—

Figure 1 represents a front elevation; Fig. 2, side elevation or view; and Fig. 3, illustration of the use of the implement.

This invention consists of a small paddle or board having a convenient handle at one end, which terminates in a small brush.

The cover of a fruit can or jar is readily loosened from the imbedding wax by striking it a smart, quick blow with the flat part of the board. The wax-dust is removed before removing the cover by means of the brush at the end of the handle.

A represents the implement, the best length being fourteen inches, and breadth at the handle-end about one and a half to two inches, and at the broadest end about four inches, with a thickness of from five-eighths to three-fourths of an inch. It is made of hard wood; but the shape is immaterial, and the thickness must not be too great, as too solid a blow would not accomplish the desired object—*i. e.*, loosening the cover by breaking the brittle wax. A brush, *b*, terminates the handle-end, and a ring, *c*, may be inserted in the larger end by which to hang the implement up in a convenient place ready for use.

The operation of this invention is as follows: Wax-sealed fruit cans or jars are opened by striking the flat part of the cover of the same a smart, quick blow with the broad flat end of this board or implement. This breaks the wax around the edges of the cover, so that the latter is easily taken off without further trouble, first removing the loose particles of the wax with a duster-brush or the brush set on the handle. A fair flat blow against the whole surface of the cover of the jar loosens the cover all round.

What I claim as my invention is—

As a new article of manufacture, the paddle for opening fruit-cans, when composed of the paddle A and brush *b*, substantially as described.

In testimony that I claim the foregoing implement for opening wax-sealed fruit cans or jars I have hereunto set my hand this 15th day of April, A. D. 1871.

ALEXANDER McCLANAHAN.

Witnesses:
 WM. JACK,
 HENRY W. WELLS.